United States Patent [19]

Thometzek et al.

[11] Patent Number: 5,055,434
[45] Date of Patent: Oct. 8, 1991

[54] SINTERABLE PULVERULENT RAW MATERIAL BASED ON ALUMINUM TITANATE, A PROCESS FOR ITS PREPARATION AND THE SINTERED BODIES PRODUCED THEREFROM AND THEIR USE

[75] Inventors: Peter Thometzek, Krefeld; Bernard Freudenberg, Coburg, both of Fed. Rep. of Germany

[73] Assignee: Bayer Aktiengesellschaft, Leverkusen, Fed. Rep. of Germany

[21] Appl. No.: 388,930

[22] Filed: Aug. 3, 1989

[30] Foreign Application Priority Data

Aug. 16, 1988 [DE] Fed. Rep. of Germany ....... 3827646

[51] Int. Cl.$^5$ ..................... C04B 35/10; C04B 35/46
[52] U.S. Cl. ................................... 501/127; 501/128; 501/134; 501/135; 501/136; 427/215
[58] Field of Search ............... 501/127, 128, 134, 135, 501/136; 427/215

[56] References Cited

U.S. PATENT DOCUMENTS

| | | | |
|---|---|---|---|
| 3,522,078 | 7/1970 | May et al. | 427/215 |
| 3,522,079 | 7/1970 | Wiseman | 427/215 |
| 3,607,343 | 9/1971 | Longo et al. | 501/127 |
| 3,632,527 | 1/1972 | Alpert et al. | 423/86 |
| 3,776,744 | 12/1973 | Clendenen | 501/134 |
| 3,825,653 | 7/1974 | Duerksen et al. | 501/134 |
| 3,981,737 | 9/1976 | Evilampi et al. | 427/215 |
| 4,542,111 | 9/1985 | Buran et al. | 501/127 |

FOREIGN PATENT DOCUMENTS 0231006 8/1987 European Pat. Off. .

Primary Examiner—William R. Dixon, Jr.
Assistant Examiner—Sue Hollenbeck
Attorney, Agent, or Firm—Connolly & Hutz

[57] ABSTRACT

Sinterable raw material product for ceramics based on aluminum titanate, consisting essentially of particles having a core/shell structure with a core of an oxide, oxide hydrate or hydroxide of ether of aluminum or titanium on which are precipitated, as a shell, sparingly soluble compounds of the other aluminum or titanium not used as the core matrial, with the molar ratio of titanium to aluminum of from 1:0.1 to 1:30, which in addition to the precipitated compounds of aluminum or titanium contains additional sparingly soluble compounds of elements in a quantity of from 0.1 to 65% by weight, calculated as oxide of the element and based on the total quantity are useful in fabricating sintered bodies for high temperature environments which include internal combustion engine parts, tubes for transporting liquid metals, catalysts carriers and so forth.

12 Claims, No Drawings

SINTERABLE PULVERULENT RAW MATERIAL BASED ON ALUMINUM TITANATE, A PROCESS FOR ITS PREPARATION AND THE SINTERED BODIES PRODUCED THEREFROM AND THEIR USE

The present invention relates to a sinterable pulverulent raw material for ceramics based on aluminium titanate, consisting of particles having a core of oxide, oxide hydrate or hydroxide of the element aluminium or titanium on which are deposited sparingly soluble compounds of the other element and sparingly soluble compounds of additional elements, the molar ratio of titanium to aluminium being from 1:0.1 to 0:30, a process for the preparation of this pulverulent raw material and sintered bodies produced from this powder and their use.

BACKGROUND OF THE INVENTION

There is a demand in technology for materials which are resistant to heat shock and suitable for operating temperatures above 900° C. and at the same time have a high level of mechanical properties enabling them to be used for engineering constructions such as those required in fusion metallurgy, e.g. throughflow governors, in the construction of apparatus, e.g. heating gas ventillators, in the construction of motor vehicles, e.g. thermal insulators of the waste gas duct (portliners), and in chemical technology, e.g. filters or catalyst carriers.

Although ceramics based on pure aluminium titanate or tialite have interesting properties, such as a low coefficient of thermal expansion (WAK) and a low modulus of elasticity, these ceramics are limited in their technological application owing to their very low strength and their tendency to decompose at temperatures in the region of about 900° C. to about 1300° C. In this temperature interval, tialite decomposes into the starting oxides, $Al_2O_3$ and $TiO_2$, and this decomposition is accompanied by a sharp rise in the coefficient of thermal expansion.

For the preparation of sinterable aluminium titanate powder, it is proposed in U.S. Pat. No. 3,825,653 to co-precipitate halogens, nitrates or alkoxy compounds of aluminium and titanium as hydroxides and to use the co-precipitate after drying and calcining for the sintering of aluminium titanate products. The products prepared by this method should have a thermal expansion in the longitudinal direction of less than $1 \times 10^{-6}/°C.$ in the temperature range of from 25° to 1000° C. Figures given for the ratio of $Al_2O_3$ to $TiO_2$ are 1:1 and from 1:3 to 3:1. The addition of compounds of other elements is not mentioned. The pressure resistance is only 34.5 mPa. The powder described in DE-C 2 345 778 is used according to U.S. Pat. No. 3,825,653 for the production of melting crucibles for uranium and uranium alloys. An equimolar ratio of $Al_2O_3$ to $TiO_2$ is regarded as suitable for the method of production by the hot press process. Owing to their low green density due to their very small particle size, the co-precipitated powders have a shrinkage of 50% after calcination.

According to U.S. Pat. No. 3,607,343, $Al_2O_3$ particles have been covered with a quantity of from 1 to 50 volumes % of $TiO_2$ by the flame spraying process (plasma spraying). The $Al_2O_3$ particles were put into the reaction with the addition of a suitable binder, e.g. one based on a phenol resin.

P. A. Brugger and A. Mocellin in Journal of Materials Science 21 (1986) 4431-4435 treat $Al_2O_3$ or $TiO_2$ particles with the other element by hydrolytic decomposition of the corresponding organometallic alcoholate compound. According to J. Am. Ceram. Soc. 69 (2), C22-C24 (1986), H. Okamura, E. A. Barringer and H. K. Bowen also apply titanium oxide hydrate to $Al_2O_3$ particles by stepwise hydrolysis of a titanium alcoholate solution. The costs of metal alcoholates and the complicated method of carrying out the reactions stand against the industrial utilization of this process.

In Advanced Ceramic Materials 2 (4) 798-803 (1987), S. Kratohvil and E. Matijevic describe the covering of $TiO_2$ particles with an aluminium oxide component of $Al_2(SO_4)_3$ solution with the aid of urea. Owing to the low concentration of the $Al_2(SO_4)_3$ solutions used and the large quantity of urea, this method is of no interest for industrial application.

In Zhurnal Prikladnoi Khimii, Volume 58, No. 10, pages 2207-2211, October 1985, L. I. Bekkerman investigated the precipitation of small quantities of aluminium hydroxide (0.58-3.03% by weight, based on $TiO_2$) on $TiO_2$ pigments.

In Report of the Research Laboratory of Engineering Materials, Tokyo Institute of Technology 9, 1984, 75-86, E. Kato, K. Daimon, J. Takahashu, R. Kato and K. Hamano describe the preparation of an $Al_2TiO_5$ raw material powder by the treatment of a solution of $TiOSO_4$ and $Al_2(SO_4)_3$ at elevated temperatures in a vacuum evaporator. One disadvantage of this process is the considerable quantity of $SO_2$ formed as gaseous product of decomposition in the reaction and another is the large amount of shrinkage of the powder when sintered.

Numerous proposals for the preparation of ceramics based on aluminium titanate have been made, in which the starting components, $Al_2O_3$, $TiO_3$ and an exactly predetermined quantity of one or more suitable additives are introduced separately before the ceramic working up. The relevant state of the art is described e.g. in DE-C 3 706 209.

It is an object of this invention to provide suitable raw material powders which do not have the disadvantages described above. It has now been found that these requirements are fulfilled by raw material powders based on aluminium titanate containing, in addition to the tialite components, $TiO_2$ and $Al_2O_3$, other suitable oxides of elements distributed very homogeneously.

BRIEF DESCRIPTION OF THE INVENTION

The object of the present invention is met by a sinterable raw material product for ceramics based on aluminium titanate, consisting essentially of particles having a core/shell structure with a core of an oxide, oxide hydrate or hydroxide of either of aluminium or titanium on which are precipitated, as a shell, sparingly soluble compounds of the other of aluminium or titanium not used as the core material, with the molar ratio of titanium to aluminium of from 1:0.1 to 1:30, which in addition to the precipitated compounds of aluminium or titanium contains additional sparingly soluble compounds of elements in a quantity of from 0.1 to 65% by weight, calculated as oxide of the element and based on the total quantity.

DETAILED DESCRIPTION OF THE INVENTION

The present invention thus relates to sinterable pulverulent raw materials for ceramics, based on aluminium titanate, consisting of particles having a core of oxide, oxide hydrate or hydroxide of the element aluminium or titanium on which are precipitated sparingly soluble compounds of the other element and sparingly soluble compounds of additional elements, the molar ratio of titanium to aluminium being from 1:0.1 to 1:30, the said particles in addition containing precipitations of one or more other sparingly soluble compounds of elements, each in a quantity of from 0.1 to 50% by weight, preferably from 0.2 to 25% by weight, calculated as the oxide of the element and based on the total quantity. The sparingly soluble compounds of the additional precipitates are preferably oxides, oxide hydrates and/or hydroxides of the elements magnesium, calcium, silicon, tin, yttrium, zirconium, niobium, tantalum, iron, cobalt, nickel, chromium, copper, zinc and/or rare earth elements. The total quantity of the additional precipitates should not be greater than 65% and is preferably from 0.2 to 35%. In another preferred embodiment, the particles of the core are $TiO_2$ particles such as finely divided titanium dioxide or titanium dioxide hydrate, hydrolysate slurry from the production of $TiO_2$ pigment or calcined titanium dioxide in the form of rutile or anatase.

The particles consituting the cores may equally advantageously consist of modifications of $Al(OH)_3$, $AlOOH$ and/or $Al_2O_3$.

The present invention also relates to a process for the preparation of the pulverulent raw materials according to the invention, in which cores of oxide, oxide hydrate and/or hydroxide of the element aluminium or titanium are covered with a precipitate of sparingly soluble compounds of the other element and the molar ratio of titanium to aluminium is from 1:0.1 to 1:30, characterised in that additional precipitates of one or more other sparingly soluble compounds of elements are applied, each in a total quantity of from 0.1 to 65% by weight, preferably from 0.2 to 35% by weight, calculated as the oxide of the element and based on the total quantity.

In a preferred embodiment of the process according to the invention, the sparingly soluble compounds of the additional precipitates are oxides, oxide hydrates and/or hydroxides of the elements, magnesium, calcium, silicon, tin, yttrium, zirconium, niobium, tantalum, iron, cobalt, nickel, chromium, copper, zinc and/or other rare earth elements.

It is surprisingly found that it is possible with the process presented here not only to cover one component of the tialite homogeneously with the other tialite component but also to precipitate other necessary additives in the same manner specifically on the core and thus ensure an exact stoichiometric distribution of the elements in the $\mu m$ range.

This results in an improvement in the thermo mechanical properties such as the strain to fracture.

Since the homogeneity is fixed on a microscopic scale, separation of the components during processing cannot occur, in contrast to powder mixtures. Control of the initial size of the grains and optimization of the packing density are considerably facilitated.

In order to be able to take advantage of the short transport paths in reaction sintering, the particles of the core should measure from 0.005 $\mu m$ to 10 $\mu m$ before precipitation, preferably from 0.01 $\mu m$ to 2 $\mu m$, and should if necessary be milled to the required size before the reaction. Care should also be taken to ensure that the particles of the core are dispersed by some conventional method before precipitation. The particles of the core may be either $TiO_2$ particles such as finely divided $TiO_2$, calcined $TiO_2$ in the form of anatase or rutile or hydrolysate slurry from the conventional production of pigments or, in the reverse case, one of the known $Al(OH)_3$, $AlOOH$ or $Al_2O_3$ modifications may be used, preferably $\alpha$-$Al_2O_3$. The starting reactants used for the precipitation may be aqueous solutions of the sulphates, chlorates or nitrates of the elements or alkali metal hydroxide solutions such as $NaAl(OH)_4$ or $Na_2Si(OH)_6$ or corresponding sols such as aluminium hydroxide sol or silica sol. In contrast to the prior art processes mentioned above, the process presented here may surprisingly be carried out without the use of the much too expensive alkoxy compounds of the elements and, associated with this, it is also possible to disperse completely with the use of organic solvents, which is a considerable advantage both economically and ecologically. The salt solutions for precipitation may be used at high concentrations.

When the core is aluminium oxide, precipitation is preferably carried out by slowly heating the aluminium oxide suspension and the salt solutions of the additives to be precipitated and optionally subsequently increasing the pH of the suspension by means of a base. A very homogeneous, dense and complete covering on the particles of core are obtained by this procedure. Alternatively, the salt solutions of titanium and of the additives may be introduced dropwise into an aluminium oxide suspension which has been heated to 70° to 105° C. and adjusted to pH 1 with an acid conventionally used for this purpose. It may also be advantageous to add a core of titanium dioxide hydrate of the kind commonly used for pigment production to this salt solution.

If the core consists of titanium oxide, the sparingly soluble compounds of aluminium and of the other components are preferably applied from the corresponding salt solutions at a pH of from 5 to 8 and at a temperature above 50° C. The aluminium component is preferably precipitated by the combined dropwise addition of an $Al_2(SO_4)_3$ solution and a $NaAl(OH)_4$ solution. Conventional acids or bases may be used as desired for exact control of the pH. A very homogeneous, complete precipitation is again ensured when these parameters are observed.

After the reaction, the products of precipitation are preferably filtered and washed, any alkali metal ions added at the stage of precipitation being optionally washed out to a residue of less than 0.1% after adjustment to a pH of 3.5 to 6. The anions used may either be to a large extent eliminated by a second step of filtration and washing at pH 7-12 or removed by calcination.

These procedures are followed by drying, preferably spray drying.

This is preferably followed by calcination at temperatures from 400° to 1250° C., in the case of an aluminium oxide core preferably from 800° to 1100° C. and in the case of a titanium oxide core preferably from 1050° to 1200° C., and the BET surface area is adjusted to a value from 30 $m^2/g$ to 1 $m^2/g$.

When these BET surface values are observed, shrinkage of less than 20% is ensured during the subsequent sintering and volatile components are optionally removed. Micronisation may subsequently be carried out, e.g. by steam jet grinding.

Advantageous results are also obtained by treating the suspension in a hot gas spray reactor at temperatures above 700° C., preferably with powerful eddy formation, after precipitation or after washing.

The raw materials according to the invention may then advantageously be shaped into green bodies by known ceramic processes and subsequently sintered to sintered bodies.

Since the firing time is to a large extent determined by the speed of transport processes during the reaction, it may be reduced when the pulverulent raw materials according to the invention are used owing to the short transport paths and the costs may therefore be correspondingly reduced.

A preferred embodiment of the process according to the invention consists in that the pulverulent raw material obtained is disagglomerated in the wet state to a $d_{50}$ particle size of less than 2 μm and a green body is formed which has a green density of at least 1.7 g/cm$^3$ and is sintered for a residence time of 0.5 to 100 hours, preferably 1 to 20 hours, at temperatures from 1250° C. to 1650° C., preferably from 1300° to 1550° C.

With the powders according to the invention produced by precipitation it is possible to obtain a material which on the microscopic scale has a much more homogeneous structure after sintering due to the highly homogeneous distribution of the individual components in the precipitation product.

This invention thus also relates to the shaped sintered bodies according to the invention, which are characterised in that they have a homogeneous structure when polished and preferably contain one or more additional phases in homogeneous distribution. The sintered bodies according to the invention are preferably reaction sintered. A preliminary calcination of the powder in order to synthesize a doped tialite powder may also be carried out.

They preferably contain aluminium titanate as the main phase. They are further characterised by high strain to fracture and fracture strength. Thus it is quite possible to obtain sintered bodies with an strain to fracture ($\delta/E$) of $>1.8\%$ o preferably 2% o and the fracture strengths are up to and greater than 20 MPa, preferably $>45$ MPa. The sintered bodies according to the invention preferably have densities of from 2.4 to 3.6 g/cm$^3$, in the case of bodies with a core of titanium oxide preferably from 2.4 to 3.3 g/cm$^3$ and in the case of bodies with an aluminium oxide core preferably from 2.8 to 3.6 g/cm$^3$.

The average thermal expansion coefficient $\alpha$ is from $-0.5$ to $3.0 \times 10^{-6} K^{-1}$ in the range of 20° C. to 1000° C.

This invention also relates to the use of the sintered bodies according to the invention for the manufacture of parts of combustion engines, in particular hollow, tube like composite bodies of metal and ceramic in the exhaust duct or for the re-inforcement of engine pistons and cylinder heads and for the production of hollow, tube like bodies for transporting liquid metals and as catalyst carriers, optionally after they have been doped with catalytically active substances.

The invention will now be illustrated with the aid of examples which, however, are not to be regarded as limiting.

EXAMPLE 1

20.93 kg of a solution containing 18.7% of TiO$_2$ and 0.41% of Fe in the form of sulphate are added to 5.67 kg of finely divided α-Al$_2$O$_3$ (Alcoa XA 1000 SG) and the mixture is heated to 100° C. in 5 hours. The pH is adjusted to 7.5 in 2 hours with 16.8 kg of a 20% ammonia solution, and 0.992 kg of silica sol 300 (trade product of Bayer AG) are added dropwise. After cooling, the product is filtered, washed, calcined at 1000° C. for 1 hour and micronized in a steam jet mill.

The powder is dispersed to form an aqueous slip in a drum mill with the addition of the usual dispersants. The slip casting is used to cast an open box from which test rods measuring 50×5×3.5 mm after firing (1415° C., 5 h) are sawn out. The crystalline phases after firing were determined by X-ray defraction measurement.

EXAMPLE 2

3.914 kg of finely divided TiO$_2$ (Bayertitan T—trade product of Bayer AG) are ground in a steam jet mill and dispersed in a 1.0% NaHCO$_3$ solution as buffer (50 g of TiO$_2$/l). Precipitation is carried out at a constant pH of 7.0 at 80° C., 26.933 kg of solution I containing 7.58% of Al$_2$O$_3$ and 0.32% of Fe as sulphate, 17.615 kg of solution II containing 20.6% of Al$_2$O$_3$ as NaAl(OH)$_4$ and 1.098 kg of solution III containing 26.7% of SiO$_2$ in the form of Na$_2$Si(OH)$_6$ being added simultaneously in 2 hours.

After cooling, the pH is adjusted to 8.0 with NaOH and the product is filtered and washed, resuspended, adjusted to pH 4.0 with H$_2$SO$_4$ and again filtered and washed. This is followed by one hour's calcining at 1150° C. and micronization in the steam jet mill. Further working up is carried out as in Example 1 except that the firing conditions are altered (1400° C., 5 h).

TABLE 1

| | Examples | |
|---|---|---|
| | Example 1 | Example 2 |
| Initial composition (% by weight) | | |
| Al$_2$O$_3$ | 55.8 | 55.3 |
| TiO$_2$ | 39.1 | 39.6 |
| SiO$_2$ | 2.7 | 2.7 |
| Fe$_2$O$_3$ | 1.3 | 1.3 |
| Na$_2$O | <0.01 | 0.02 |
| SO$_4^{2-}$ | 0.01 | 0.01 |
| BET (m$^2$/g) | 13.6 | 23.9 |
| Crystalline phases after firing (% by weight) | | |
| Al$_{2-x}$Fe$_x$TiO$_5$ | 91 | 88 |
| Mullite | 8 | 12 |
| Al$_2$O$_3$ | <1 | <1 |
| TiO$_2$ | <1 | <1 |
| Properties | | |
| Sintering density (g/cm$^3$) | 3.40 | 2.65 |
| Shrinkage on sintering (%) | 13.5 | 7.5 |
| Flexural strength (MPa) | 61 | 46.2 |
| E modulus (GPa) | 23 | 19.5 |
| Co-efficient of thermal expansion (RT - 1000° C.) $\left(10^{-6}\frac{1}{K}\right)$ | 1.9 | 2.1 |

What we claim is:

1. Sinterable raw material product for ceramics based on aluminum titanate, consisting essentially of particles having a core/shell structure with a core having a size between about 0.1 and 2 microns, the core composed of one of the modifications of Al(OH)$_3$, AlOOH, Al$_2$O$_3$ or mixtures thereof on which are precipitated, as a shell, sparingly soluble compounds of titanium, with the molar ratio of titanium to aluminum of from 1:0.1 to 1:30, which in addition to the precipitated compounds contains additional sparingly soluble oxides, oxide hydrates, hydroxides, or mixtures thereof, of elements in a quantity of from 0.1 to 65% by weight, calculated as oxide of the element and based on the total quantity by weight.

2. Sinterable raw material powder according to claim 1, wherein the additional sparingly soluble compounds of the additional precipitations are oxides, oxide hydrates or hydroxides of magnesium, calcium, silicon, tin, yttrium, zirconium, niobium, tantalum, iron, cobalt, nickel, chromium, copper, zinc, rare earth elements or mixtures thereof.

3. Sinterable raw material powder according to claim 1 wherein the additional sparingly soluble compound amounts to 0.2 to 35% by weight.

4. Process for the preparation of sinterable raw material powder according to claim 1 which comprises precipitating sparingly soluble compounds of titanium onto a particulate core of one of the modifications of Al(OH)$_3$, AlOOH, Al$_2$O$_3$ or mixtures thereof with the molar ratio of titanium to aluminum being from 1:0.1 to 1:30, and further comprising additionally precipitating on the core one or more other sparingly soluble oxides, oxide hydrates, hyroxides, or mixtures thereof of elements in a total quantity of from 0.1 to 65% by weight, calculated as oxide of the element and based on the total quantity by weight.

5. Process according to claim 4 wherein the additional sparingly soluble compounds of the additional precipitate are oxides, oxide hydrates or hydroxides of magnesium, calcium silicon, tin, yttrium, zirconium, niobium, tantalum, iron, cobalt, nickel, chromium, copper, zinc, rare earth elements or mixtures thereof.

6. Process according to claim 4 wherein the additional sparingly soluble compound amounts to 0.2 to 35% by weight.

7. Process according to claim 4 wherein after precipitation of the sparingly soluble compounds and the additional sparingly soluble compounds, the product is dried and calcined.

8. Process according to claim 7 wherein calcining is carried out at temperatures from 400° to 1250° C., and the BET surface area is adjusted to a value from 30 m$^2$/g to 1 m$^2$/g.

9. Process according to claim 8 wherein the core is aluminium oxide and the calcining is at temperatures from 800° to 1100° C.

10. Process according to claim 6 wherein the product raw material powder is disagglomerated in the wet state to a d$_{50}$ particle size of less than 2 µm and a green body is formed which has a green density of at least 1.7 g/cm$^3$ and which is sintered for a residence time of from 0.5 to 100 hours at temperatures from 1250° C. to 1650° C.

11. Process according to claim 10 wherein the green body is sintered for a residence time of 1 to 20 hours at temperatures from 1300° to 1550° C.

12. Sintered bodies obtainable by sintering a shaped raw material product as claimed in claim 1 whereby the sintered body has a homogeneous structure and contains one or more phases in homogeneous distribution.

* * * * *